Patented June 17, 1930

1,764,589

UNITED STATES PATENT OFFICE

WILLIAM A. WISSLER, OF JACKSON HEIGHTS, NEW YORK, ASSIGNOR TO HAYNES STELLITE CO., A CORPORATION OF INDIANA

COATING FOR WELDING RODS

No Drawing.    Application filed November 22, 1927. Serial No. 235,122.

My invention is a welding flux, particularly adapted to electric welding of the type which is carried out by using a metal rod as one terminal of an arc and transferring metal by means of the arc to the metal to be welded.

In arc welding, considerable difficulty is experienced in maintaining the arc and consequently in obtaining a continuous homogeneous deposition of metal. The intense heat of the arc favors reactions of the weld metal with the surrounding gases, and a flux to protect the welded metal is desirable. It is known that the arc will be more stable and operate in a more satisfactory manner if welding electrodes are coated.

It is desirable to have rods coated with an arc stabilizing material that will evolve a relatively large quantity of a protective gas before the metal has been heated to liquefaction, that will produce a residual material which will flux compounds such as oxides, that will form a protective layer on the deposited metal and that will form a residual flux which is not effervescent. The coating should be of such nature that it will not be removed when the rods are handled.

I have made electrodes embodying these advantages by applying to a rod of iron or other metal or alloy a mixture containing a flux composed of a mixture of dry powdered calcium carbonate, silica and borax glass and a vehicle consisting of shellac or a varnish gum and a non-aqueous volatile thinner. The preferred coating composition is made by mixing equal parts of dry calcium carbonate, silica and borax glass with a sufficient quantity of a shellac-alcohol mixture to make a thin coating on the rods when they are dipped into or brushed with the coating material. I prefer to use equal parts of the calcium carbonate, silica and borax glass but a wide variation in the proportions of the ingredients will operate satisfactorily. Other carbonates of the alkaline earths may be substituted for or used with the calcium carbonate and dry sodium carbonate may be substituted for or used with the borax glass. A varnish containing a varnish resin may be used for the vehicle and it is sometimes desirable to do so where the electrodes are subjected to rough handling. The rods may be entirely or partially covered with the coating.

The physical characteristics of the film are similar to those of varnish or paint and it retains its character as a protective coating for the electrode practically until the metal is fused by the arc. In the operation of welding, the film or coating on the rod is sufficiently fusible to be liquefied at the proper rate. In addition to its action in stabilizing the arc, there is produced at a relatively low temperature as compared to the heat of the arc, an evolution of gas that is not injurious to the welding metal and does not materially alter its composition. The material that is deposited with the weld metal is a quiescent melted flux for metal oxides and it provides a protective coating for the weld.

What I claim is:

1. A flux forming material containing about equal parts of an alkaline earth carbonate, silica and borax glass, said material being free from reducible metals and substances that emit water when heated.

2. A flux forming material comprising a mixture consisting of about equal parts of calcium carbonate, silica, and borax glass and a binder therefor.

In testimony whereof, I affix my signature.

WILLIAM A. WISSLER.